(12) United States Patent
Xie (10) Patent No.: US 11,586,772 B2
(45) Date of Patent: Feb. 21, 2023

(54) METHOD AND DEVICE FOR DISPLAYING INFORMATION

(71) Applicant: Beijing Bytedance Network Technology Co., Ltd., Beijing (CN)

(72) Inventor: Yuanjie Xie, Beijing (CN)

(73) Assignee: Beijing Bytedance Network Technology Co., Ltd., Beijing (CN)

(*) Notice: Subject to any disclaimer, the term of this patent is extended or adjusted under 35 U.S.C. 154(b) by 0 days.

(21) Appl. No.: 17/370,837

(22) Filed: Jul. 8, 2021

(65) Prior Publication Data

US 2021/0406389 A1 Dec. 30, 2021

Related U.S. Application Data

(63) Continuation of application No. PCT/CN2020/070352, filed on Jan. 3, 2020.

(30) Foreign Application Priority Data

Jan. 11, 2019 (CN) .......................... 201910027169.9

(51) Int. Cl.
*G06F 21/62* (2013.01)
*G06Q 50/00* (2012.01)
(Continued)

(52) U.S. Cl.
CPC ........ *G06F 21/629* (2013.01); *G06F 21/6218* (2013.01); *G06Q 50/01* (2013.01); *H04L 51/52* (2022.05); *H04L 67/535* (2022.05)

(58) Field of Classification Search
CPC ... G06F 21/629; G06F 21/6218; G06Q 50/01; H04L 51/32; H04L 67/22
See application file for complete search history.

(56) References Cited

U.S. PATENT DOCUMENTS 9,071,509 B2 * 6/2015 Mallet ................... H04L 67/141
10,049,472 B1 8/2018 Croom et al.
(Continued)

FOREIGN PATENT DOCUMENTS

| CA | 2969094 C | * | 3/2018 | ............. H04L 67/22 |
| CN | 103729771 A | * | 4/2014 | |
| CN | 106028166 A | * | 10/2016 | |

OTHER PUBLICATIONS

Wang et al. Beyond the Watching: Understanding Viewer Interactions in Crowdsourced Live Video Broadcasting Services. IEEE Transactions on Circuits and Systems for Video Technology. vol. 29, Is. 11. pp. 3454-3468. Oct. 22, 2018. Oct. 8, 2022. <https://ieeexplore.ieee.org/stamp/stamp.jsp?tp=&arnumber=8502830> (Year: 2018).*
(Continued)

*Primary Examiner* — Andrew B Whitaker
*Assistant Examiner* — Shaun D Sensenig (57) ABSTRACT

The embodiment of the present disclosure discloses a method and device for displaying information. A specific mode of execution for the method comprises the following steps: in response to the detection of a first preset operation performed by a first user on the page of a second user, sending operation prompt information to a terminal device used by the first user, the page of the second user being used for exhibiting contents shared by the second user, the first preset operation being used for requesting to add a user label corresponding to the second user for the first user; in response to the detection of the second preset operation completed by the first user, adding the user label for the first user; generating an initial associated value used for indicating the association degree between the first user and the second user, and displaying the initial associated value on the page.

16 Claims, 4 Drawing Sheets

(51) Int. Cl.
   *H04L 51/52*      (2022.01)
   *H04L 67/50*      (2022.01)

(56)         References Cited

U.S. PATENT DOCUMENTS

| | | | |
|---|---|---|---|
| 10,803,648 B1* | 10/2020 | Walton | G06F 16/94 |
| 2013/0117261 A1* | 5/2013 | Sambrani | G06F 16/9535 |
| | | | 707/734 |
| 2013/0298000 A1 | 11/2013 | Zuccarino et al. | |
| 2014/0080110 A1* | 3/2014 | Nguyen | G09B 7/00 |
| | | | 434/362 |
| 2015/0066832 A1* | 3/2015 | Kulik | G06F 21/552 |
| | | | 706/47 |
| 2015/0106429 A1 | 4/2015 | Hegberg et al. | |
| 2016/0371387 A1 | 12/2016 | Serena | |

OTHER PUBLICATIONS

English Translation of International Search Report for Application No. PCT/CN2020/070352, dated Mar. 26, 2020, 2 pages.
Chinese Patent Application No. 201910027169.9, First Office Action dated Mar. 26, 2020, 10 pages.
Examination report dated Mar. 14, 2022 in Indian Patent Application No. 202127036072 with English translation.
The Extended European Search Report dated Feb. 4, 2022 in European Patent Application No. 20738922.2.
Communication pursuant to Rules 70(2) and 70a(2) EPC dated Feb. 22, 2022 in European Patent Application No. 20738922.2.
Written Opinion dated Oct. 19, 2022 in Singapore Application 11202107324P (7 pages).

* cited by examiner

METHOD AND DEVICE FOR DISPLAYING INFORMATION

CROSS REFERENCE TO RELATED APPLICATIONS

This application is the continuation application of International Application No. PCT/CN2020/070352, filed on Jan. 3, 2020, which is put forward based on Chinese Patent Application No. 201910027169.9, filed on Jan. 11, 2019, and entitled "Method and Device for Displaying Information", and claims priority of this Chinese Patent Application, the entire contents of which are hereby incorporated by reference herein.

TECHNICAL FIELD

Embodiments of the present disclosure relate to the technical field of computers, in particular to a method and device for displaying information.

BACKGROUND

With the rapid development of an Internet technology, there are massive users using the Internet every day. Concomitantly, many applications for user interaction, content sharing and the like have emerged.

Generally, a user can own page after registering these applications. The user can share contents and the like created or concerned by himself or herself on the own page. Meanwhile, the user can also access pages of other users so as to browse contents and the like created or concerned by other users.

In some cases, the user can also make comments on the pages of other users or transmit virtual items and the like which can be used by himself or herself to other users so as to interact with other users. Interaction modes provided for the users, an association relationship among the users, activity levels of the users and association among these attributes are being researched and analyzed all the time at present, so that a more friendly and high-quality Internet interaction platform is provided for the users according to an analysis result.

SUMMARY

Embodiments of the present disclosure provide a method and device for displaying information.

In the first aspect, the embodiments of the present disclosure provide a method for displaying information, the method comprising transmitting operation prompt information to terminal equipment used by a first user in response to detection that the first user performs a first preset operation on a page of a second user, wherein the page is used for displaying contents shared by the second user, the first preset operation is used for requesting to add a user tag corresponding to the second user for the first user, and the operation prompt information is used for prompting the first user to perform a second preset operation; adding the user tag for the first user in response to detection that the first user completes the second preset operation, generating an initial association value for expressing an association degree between the first user and the second user, and displaying the initial association value on the page.

In some embodiments, the method further comprises: acquiring attribute information of a target attribute of a preset interaction operation in response to detection that the first user performs the preset interaction operation on the page; updating the initial association value according to the attribute information to obtain a new association value; and updating the initial association value displayed on the page to the obtained new association value.

In some embodiments, the preset interaction operation comprises at least one of the following operations: an access operation, an operation of transmitting a link address of the page and a virtual item associated operation, wherein the virtual item associated operation is used for adding a virtual item into a virtual item set of the second user.

In some embodiments, the method further comprises: adding a virtual item corresponding to the initial association value into a virtual item set of the first user; and after the initial association value is updated according to the attribute information to obtain the new association value, the method further comprises: adding a virtual item corresponding to the obtained new association value into the virtual item set of the first user.

In some embodiments, the method further comprises: displaying user information of the user having the user tag to the terminal equipment used by the second user in response to receiving a request transmitted by the second user by virtue of used terminal equipment and used for requesting to view the user having the user tag, wherein the user information comprises a latest association value between the user and the second user.

In some embodiments, receiving a new user tag transmitted by the second user by virtue of the used terminal equipment, and changing the user tag corresponding to the second user to the received new user tag in response to receiving a request transmitted by the second user by virtue of used terminal equipment and used for requesting to change the user tag.

In the second aspect, the embodiments of the present disclosure provide a device for displaying information, comprising: a prompt unit configured to transmit operation prompt information to terminal equipment used by a first user in response to detection that the first user performs a first preset operation on a page of a second user, wherein the page is used for displaying contents shared by the second user, the first preset operation is used for requesting to add a user tag corresponding to the second user for the first user, and the operation prompt information is used for prompting the first user to perform a second preset operation; and a display unit configured to add the user tag for the first user in response to detection that the first user completes the second preset operation, generate an initial association value for expressing an association degree between the first user and the second user, and display the initial association value on the page.

In some embodiments, the device further comprises: an acquisition unit configured to acquire attribute information of a target attribute of a preset interaction operation in response to detection that the first user performs the preset interaction operation on the page; an update unit configured to update the initial association value according to the attribute information to obtain a new association value; the update unit further configured to update the initial association value displayed on the page to the obtained new association value.

In some embodiments, the preset interaction operation comprises at least one of the following operations: an access operation, an operation of transmitting a link address of the page and a virtual item associated operation, wherein the virtual item associated operation is used for adding a virtual item into a virtual item set of the second user.

In some embodiments, the device further comprises: an addition unit configured to add a virtual item corresponding to the initial association value into a virtual item set of the first user; the addition unit further configured to add a virtual item corresponding to the obtained new association value into the virtual item set of the first user.

In some embodiments, the device further comprises: an user information display unit configured to display user information of the user having the user tag to the terminal equipment used by the second user in response to receiving a request transmitted by the second user by virtue of used terminal equipment and used for requesting to view the user having the user tag, wherein the user information comprises a latest association value between the user and the second user.

In some embodiments, the device further comprises: an user tag change unit configured to receive a new user tag transmitted by the second user by virtue of the used terminal equipment, and changing the user tag corresponding to the second user to the received new user tag in response to receiving a request transmitted by the second user by virtue of used terminal equipment and used for requesting to change the user tag.

In the third aspect, the embodiments of the present disclosure provide a server, the server comprise one or more processors; and a storage device used to store one or more programs; when the one or more programs are executed by the one or more processors, the method of any one of implements described in the first aspect by the one or more processors.

In the fourth aspect, the embodiments of the present disclosure provide a computer readable medium, stored with a computer program therein, wherein when the program is executed by a processor, the method of any one of implements described in the first aspect.

According to the method and device for displaying information provided by the embodiments of the present disclosure, operation prompt information is transmitted to terminal equipment used by a first user in response to detection that the first user performs a first preset operation on a page of a second user, wherein the page of the second user is used for displaying contents shared by the second user, the first preset operation is used for requesting to add a user tag corresponding to the second user for the first user, and the operation prompt information is used for prompting the first user to perform a second preset operation; the user tag is added for the first user in response to detection that the first user completes the second preset operation, an initial association value for expressing an association degree between the first user and the second user is generated, and the initial association value is displayed on the page, so that an operation access establishing an association relationship with the user is provided for other users on a page of a user, an association degree among the users is quantitatively expressed after the association relationship is established, and then, more information on the association relationship among the users is obtained.

BRIEF DESCRIPTION OF THE DRAWINGS

By reading detailed descriptions of nonrestrictive embodiments with reference to the following accompanying drawings, other features, objectives and advantages of the present disclosure will become more apparent.

DETAILED DESCRIPTION

The present disclosure will be further described in detail below in conjunction with the accompanying drawings and embodiments. It can be understood that specific embodiments described herein are merely intended to explain relevant disclosure, rather than to limit the present disclosure. In addition, it should be further noted that parts relevant to the relevant disclosure are merely shown in the accompanying drawings in order to facilitate description.

It should be noted that the embodiments in the present disclosure and features in the embodiments can be combined with each other without conflicts. The present disclosure will be described in detail below with reference to the accompanying drawings and in conjunction with the embodiments.

Figure 1:
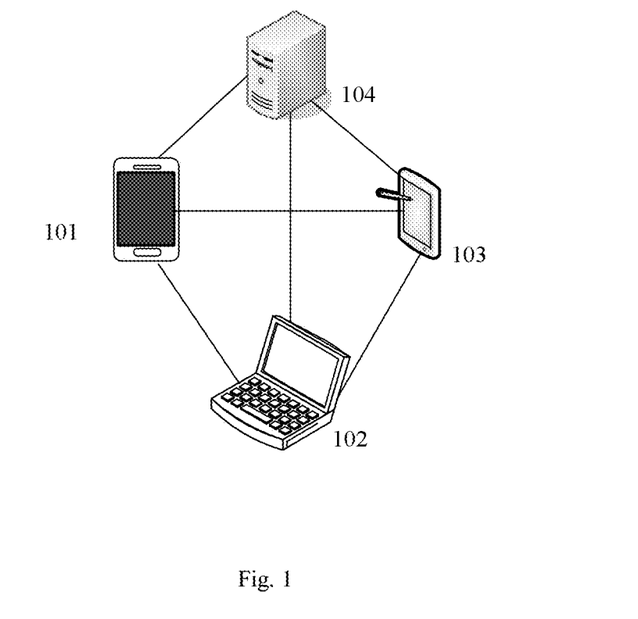
FIG. 1 is a diagram of an exemplary system architecture in which one embodiment of the present disclosure may be applied.

FIG. 1 shows an exemplary architecture 100 capable of applying an embodiment of a method or device for displaying information in the present disclosure.

As shown in FIG. 1, the system architecture 100 may include terminal equipment 101, 102 and 103 and a server 104. The terminal equipment 101, 102 and 103 may be in communication connection with the server 104 in various connection manners such as a wired communication link, a wireless communication link or an optical cable.

The terminal equipment 101, 102 and 103 may be provided with various client applications such as a browser application, a social application, a search application and a content sharing application. Users corresponding to the terminal equipment 101, 102 and 103 may access their own pages through the client applications installed on the terminal equipment 101, 102 and 103.

In some cases, the terminal equipment 101, 102 and 103 may be provided with client applications capable of establishing corresponding pages for all registered users. At the moment, the users may view their own pages or access pages of other users by logging in the client applications installed on the used terminal equipment 101, 102 and 103. For example, a user of the terminal equipment 101 may view own page or access pages of other users (such as a user corresponding to the terminal equipment 102 and a user corresponding to the terminal equipment 103).

In some cases, the terminal equipment 101, 102 and 103 may be provided with a browser application and the like for browsing web pages. At the moment, a user may use these applications to log in on web pages to access own page or pages of other users. Or, the user may also directly input a link address of own page or link addresses of other users to access own page or pages of other users.

The terminal equipment 101, 102 and 103 may be hardware or software. When being the hardware, the terminal equipment 101, 102 and 103 may be various electronic equipment supporting page display, including, but not limited to a smart phone, a tablet computer, an electronic book reader, a portable laptop computer and a desk computer. When being the software, the terminal equipment 101, 102 and 103 may be installed in the electronic equipment listed as above. The terminal equipment 101, 102 and 103 may be implemented as a plurality of software or hardware modules (such as a plurality of software or software modules for providing distributed service) or implemented as a single software or software module, which is not specifically limited herein.

The server 104 may be a backend server for providing support for a user to view or browse pages of other users by virtue of the used terminal equipment. The server 104 may receive an access request transmitted by a user by virtue of the used terminal equipment and used for accessing other users and return the pages of other users to the terminal equipment used by the user. The server 104 may also detect user operations on the accessed pages and return corresponding prompt information to the terminal equipment used by the user according to the detected user operations.

It should be noted that the method for displaying information provided by the embodiments of the present disclosure is generally executed by the server 104, and correspondingly, the device for displaying information is generally disposed in the server 104.

It should be noted that the server 104 may be hardware or software. When being the hardware, the server may be implemented as a distributed server cluster composed of a plurality of servers or implemented as a single server. When being the software, the server may be implemented as a plurality of software or software modules (such as a plurality of software or software modules for providing distributed service) or implemented as a single software or software module, which is not specifically limited herein.

It should be understood that the numbers of the terminal equipment and the server in FIG. 1 are merely illustrative. There may be any number of terminal equipment and servers according to an implementation demand.

Figure 2:
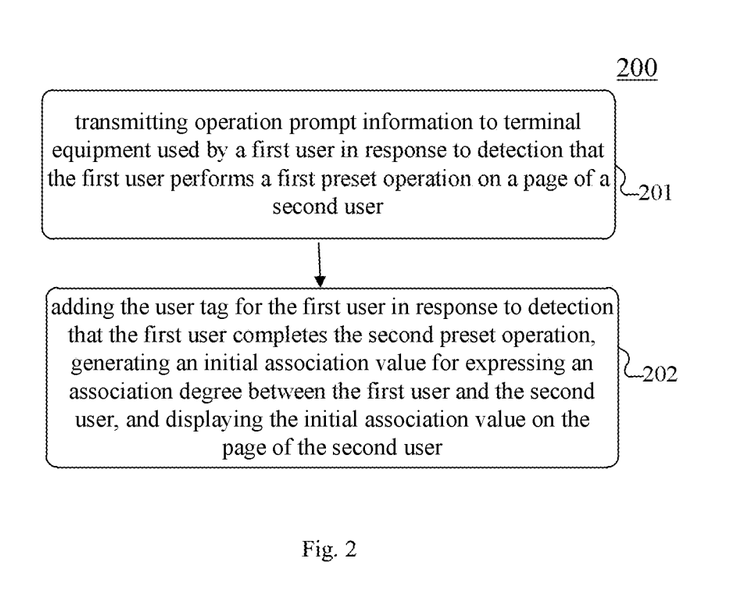
FIG. 2 is a flow chart of one embodiment of a method for displaying information according to the present disclosure.

Continuing to refer to FIG. 2 which shows a process flow 200 of one embodiment of a method for displaying information according to the present disclosure. The method for displaying information includes the following steps:

Step 201, operation prompt information is transmitted to terminal equipment used by a first user in response to detection that the first user performs a first preset operation on a page of a second user.

In the present embodiment, the page of the second user may be used for displaying contents shared by the second user. The contents shared by the second user may refer to various information which can be displayed. The shared contents may include contents created by the second user, such as texts written by the second user, images drawn by the second user and videos recorded by the second user. The shared contents may also include contents concerned by the second user, such as contents copied by the second user and created by other users.

Under different application scenarios or business demands, the page of the second user may have different display modes and contents. As an example, for a picture sharing application, the page of the second user may refer to a page for displaying all pictures shared by the second user. For a live broadcast application, the page of the second user may refer to a page for displaying current and historical live broadcast contents of the second user.

It should be understood that partial contents on the page of the second user may be linked to a new page by clicking or other operations so as to display more detailed contents corresponding to these contents. At the moment, there are still contents shared by the second user displayed on the skipped page. Therefore, the skipped new page can also be regarded as the page of the second user. As an example, for a music recording application, the page of the second user may refer to a page on which all songs recorded by the second user are displayed, and the page of the second user may also refer to a page for displaying one of all the songs recorded by the second user.

In the present embodiment, an execution subject (such as the server 104 shown in FIG. 1) of the method for displaying information may detect various operations of other users on the page of the second user. The first preset operation may be used for requesting to add a user tag corresponding to the second user for the first user. The first preset operation may be various types of user operations. Specifically, the first preset operation may be an operation pre-specified by a technician.

For example, in some application scenarios, in addition to the contents shared by the second user, some information which may be used for interaction, such as icons for interaction and text boxes for comments, can also be displayed on the page of the second user. At the moment, the first preset operation may be set to click preset icons on the page or input a preset amount or more of comment information to the text boxes for comments, and the like.

In the present embodiment, the operation prompt information may be used for prompting the first user to perform a second preset operation. The second preset operation may be various types of user operations. Specifically, the second preset operation may be an operation pre-specified by a technician according to a specific application demand or product demand. In some application scenarios, the second preset operation may also be a necessary condition for adding the user tag corresponding to the second user for the first user.

As an example, the second preset operation may be an operation of completing identity verification. The second preset operation may also be an operation of filling in user information. The second preset operation may further be an operation of completing the payment of a predetermined value.

In the present embodiment, the first user having the user tag may refer to a user completing the second preset operation and performing the first preset operation on the page of the second user. The user tag may be various types of information in different application scenarios.

As an example, the user tag may be expressed by an attribute field of a user. At the moment, a user having a user tag of which the field is nonempty may be regarded as a user having a user tag. A user having a user tag of which the field is empty may be regarded as a user not having a user tag.

It should be noted that, in order to facilitate describing two interactive users, one of the users is named as the first user, and the other user is named as the second user. It should be understood by those skilled in the art that "first" and "second" do not construct special limitations on the users.

Similarly, in order to facilitate describing preset operations detected in different scenarios, the preset operations are respectively named as the first preset operation and the second preset operation. It should be understood by those skilled in the art that "first" and "second" do not construct special limitations on the preset operations.

Step 202, the user tag is added for the first user in response to detection that the first user completes the second preset operation, an initial association value for expressing an association degree between the first user and the second user is generated, and the initial association value is displayed on the page of the second user.

In the present embodiment, a specific performing process of adding the user tag for the first user may be determined according to a specific application scenario. For example, the user tag may be added for the first user by assigning a value to the field of the user tag of the first user. For another example, the user tag may be added for the first user by adding a user identity (such as an equipment identification code of the terminal equipment used by the first user, an internet protocol address and a register account of the first user) of the first user to a target database. The target database may be used for storing the user identity of the user having the above-mentioned user tag corresponding to the second user.

In the present embodiment, the initial association value may be pre-specified by a technician. The initial association value may also be calculated according to a preset condition and an actual demand. For example, the initial association value may be determined according to an association degree of historical behavior data of the first user and the contents on the page of the second user. The higher the association degree, the higher the corresponding assigned initial association value. For another example, the initial association value may be determined according to an attribute value of a target attribute of the first user. The target attribute may be pre-specified. A corresponding relationship between the attribute value of the target attribute and the initial association value may also be preset.

The initial association value may be in various modes. For example, the initial association value may be a specific numerical value. The initial association value may also be some preset class identifiers. For example, the association degree may be divided into four classes "A", "B", "C" and "D". One of the classes may be pre-specified as the initial association value.

It should be understood that it may be set that the larger association value represents higher association degree between the first user and the second user. Correspondingly, it may also be set that the larger association value represents lower association degree between the first user and the second user.

In the present embodiment, the initial association value may be displayed on the page in various modes. For example, the initial association value may be displayed in a preset area of the page. For another example, the initial association value may be displayed with an icon such as a progress bar.

It should be understood that the initial association value may be set to be only visible to the first user in some scenarios. At the moment, the initial association value corresponding to the first user is not displayed on the page, accessed by other users, of the second user. The initial association value corresponding to the first user is only displayed on the page, accessed by the first user, of the second user.

Figure 3:
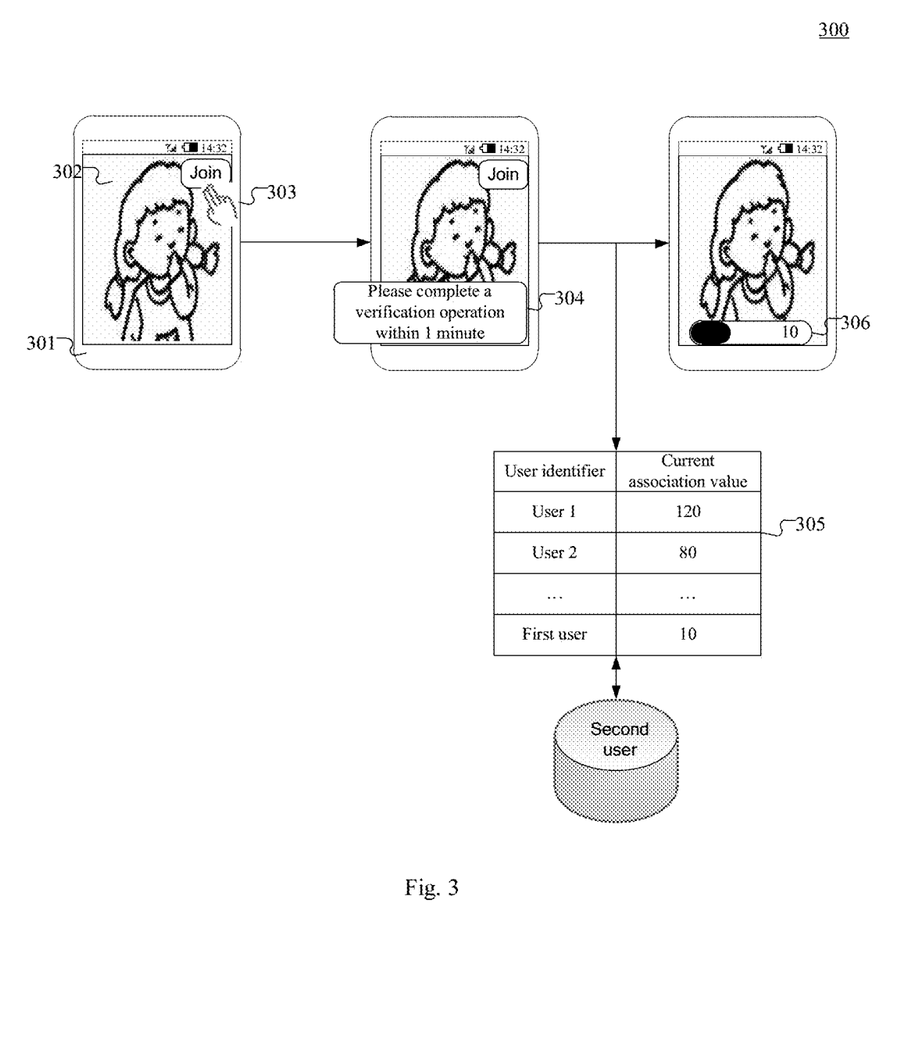
FIG. 3 is a schematic diagram of an application scenario of a method for displaying information according to an embodiment of the present disclosure.

Continuing to refer to FIG. 3 which is a schematic diagram 300 of an application scenario of the method for displaying information according to the present embodiment. In the application scenario in FIG. 3, the second user is live broadcasting by using a live broadcast application, and the first user accesses a live broadcast page 302 of the second user by virtue of terminal equipment 301. At the moment, the execution subject may be a backend server supporting the live broadcast application.

When detecting that the first user clicks a join button (shown with a reference number 303 in the drawing) on the live broadcast page 302 of the second user to make a request for joining a user group following the second user, the execution subject may transmit prompt information 304 to the terminal equipment 301 used by the first user so as to prompt the first user to complete a verification operation within 1 minute.

When detecting that the verification operation is completed, the above-mentioned execution subject may add a user identifier of the first user (such as a register account of the first user in a target application) into a data table 305 in a database of the second user. The data table 305 may be used for storing user identifiers of users following the second user.

Meanwhile, the above-mentioned execution subject may generate the initial association value of the first user and display the initial association value on the live broadcast page of the second user (shown with a reference number 306 in the drawing). The initial association value may be used for expressing the association degree between the first user and the second user.

The data table 305 may also store a current association value corresponding to each user having the user identifiers. At the moment, the initial association value corresponding to the first user may also be updated to the data table 305.

According to the method provided in the above-mentioned embodiment of the present disclosure, an operation access establishing an association relationship with the second user is provided for the first user on the page of the second user, so that an association relationship is established between the first user and the second user after the corresponding preset operations are completed by the first user; and meanwhile, the association relationship between the first user and the second user is quantified by initializing the initial association value for characterizing the association degree to obtain more specific and detailed association information of the first user and the second user. In addition, the association value corresponding to the first user may also be displayed on the page of the second user, thereby providing more information to the first user, which is beneficial to the stimulation of increment of the number of interactions between the first user and the second user, and prolonging the staying time of the first user on the page.

Figure 4:
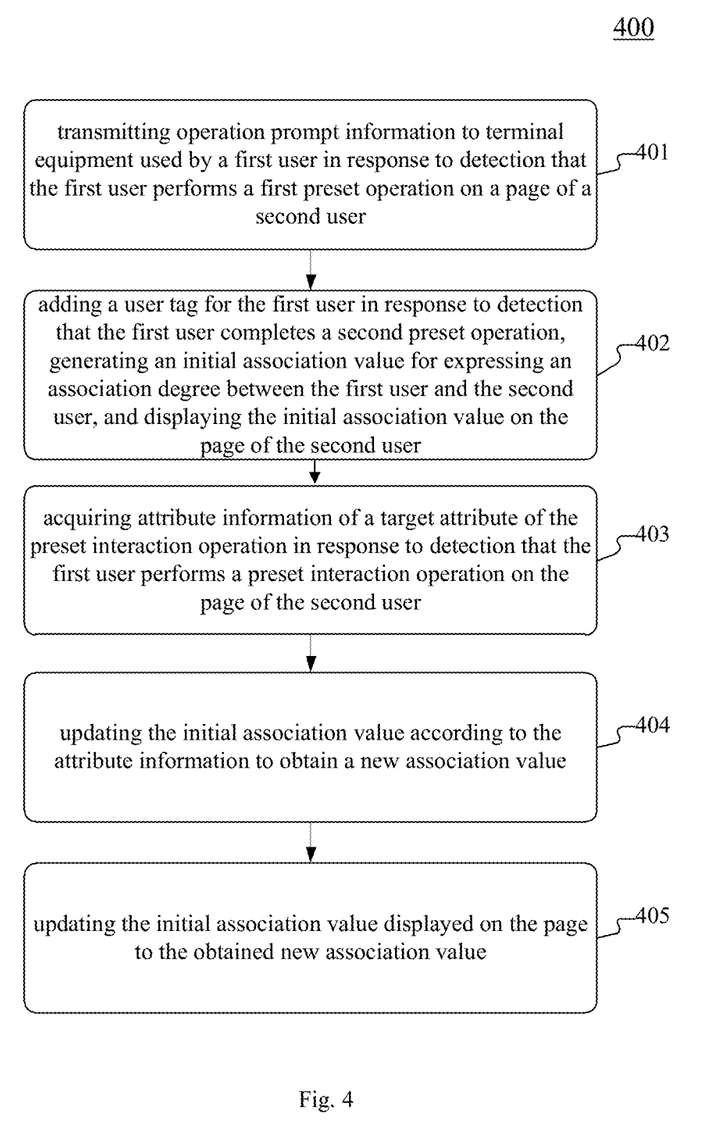
FIG. 4 is a flow chart of another embodiment of the method for displaying information according to the present disclosure.

Further referring to FIG. 4 which shows a process flow 400 of another embodiment of the method for displaying information. The process flow 400 of the method for displaying information includes the following steps:

Step 401, operation prompt information is transmitted to terminal equipment used by the first user in response to detection that a first user performs a first preset operation on a page of a second user.

Step 402, a user tag is added for the first user in response to detection that the first user completes a second preset operation, an initial association value for expressing an association degree between the first user and the second user is generated, and the initial association value is displayed on the page of the second user.

Specific performing processes of the above-mentioned steps 401 and 402 may refer to relevant descriptions of steps 201 and 202 in the corresponding embodiment in FIG. 2, the descriptions thereof are omitted herein.

Step 403, attribute information of a target attribute of the preset interaction operation is acquired in response to detection that the first user performs a preset interaction operation on the page of the second user.

In the present embodiment, the preset interaction operation may be various pre-specified user operations. For example, the interaction operation may be to comment the contents on the page of the second user or click some links on the page of the second user and the like.

Wherein, the target attribute of the preset interaction operation may refer to some attributes relevant to the preset interaction operation. Different interaction operations may have different attributes. The target attribute may be specified by a technician according to an actual application demand. The target attribute may also be an attribute conforming to a preset condition.

In some optional implementations of the present embodiment, the preset interaction operation may include at least one of the following operations: an access operation, an operation of transmitting a link address of the page of the second user and a virtual item associated operation.

Wherein, the access operation may refer to an operation of opening and browsing the page of the second user. The first user may transmit the link address of the page of the second user to other users or share the link address of the page of the second user to the page of the first user itself.

In some application scenarios, for example, some interaction applications may be provided with various virtual items. Each virtual item may have a corresponding value or a corresponding tag or a corresponding acquisition condition. When a user pays for the corresponding value, or owns the corresponding tag, or the corresponding acquisition condition is met, the corresponding virtual item may be given to the user. The virtual item owned by the user herself/himself may also be given to other users by the user.

Optionally, the association value may be used as an acquisition condition of the virtual item. Users having different association values may have different virtual items.

Wherein, the virtual item may include a virtual gift, a virtual service, a virtual badge, a virtual permission, a virtual special effect, a virtual currency and the like. At the moment, a corresponding virtual item set may be set for each user. When the virtual item set is empty, it means that the corresponding user has no any virtual item. Wherein the virtual item associated operation may be used for adding the virtual item into the virtual item set of the second user.

Optionally, corresponding virtual items may be set for different association values. That is, any user may own a virtual item corresponding to an association value corresponding to the user. At the moment, after the initial association value corresponding to the first user is generated, a virtual item corresponding to the initial association value may be added to the virtual item set of the first user.

In the present embodiment, for different interaction operations and even different target attributes, there may be different attribute information acquisition methods, and the specific acquisition methods may be selected according to specific application scenarios.

As an example, for the access operation, access time may be set as the target attribute. At the moment, the access time of the first user may be counted. For the virtual item associated operation, a value corresponding to the virtual item may be set as the target attribute. At the moment, the value corresponding to the virtual item may be acquired from a backend database.

Step 404, the initial association value is updated according to the attribute information to obtain a new association value.

In the present embodiment, after the first user has the user tag corresponding to the second user, the initial association value is updated according to an interaction operation between the first user and the second user so as to guarantee the accuracy of the association value.

Wherein, a relationship between the attribute information and the updated association value may be set according to a specific business demand or product demand. For example, for the attribute of access time, a corresponding relationship between the access time and the association value may be set. At the moment, an association value corresponding to the access time of a user may be directly acquired as the updated new association value.

It should be understood that after the initial association value is updated, there may also be an interaction operation between the first user and the second user, the association value may be updated all the time according to the interaction operation between the first user and the second user, thereby ensuring that the current latest association value is capable of expressing the association degree between the first user and the second user as accurately as possible.

Optionally, after the initial association value of the first user is updated, the virtual item corresponding to the new association value corresponding to the first user may be added to the virtual item set of the first user.

Optionally, parameters for characterizing a user permission may be amended according to the latest association value corresponding to the first user so as to enable the first user to have a permission corresponding to the latest association value.

In some application scenarios, the permission of the first user may be adjusted according to the association value corresponding to the first user. The permission may be used for limiting functions which may be used or may not be used by a user. For example, after the association value corresponding to the first user is updated every time, the increment of an intimacy value of the first user may be correspondingly adjusted.

For another example, after the association value corresponding to the first user is updated to a threshold value of a preset value, the first user is enabled to have a permission of owning a special effect when entering the page of the second user, and/or the first user is enabled to display a special effect for prompting the update of the association value of the first user to all current access users on the first page when the association value is updated every time.

Generally, the above-mentioned execution subject may set the parameters for characterizing the user permission, and permission of each user may be amended by amending these parameters. For example, a permission parameter table may be set for each user. At the moment, corresponding parameters may be amended in a parameter table corresponding to the first user so that the first user has a permission corresponding to the latest association value.

The above-mentioned execution subject may also set a user identifier set capable of using the permission and a user identifier set incapable of using the permission for each permission. At the moment, the user identifier of the first user may be added into the user identifier set capable of using the permission and corresponding to the permission corresponding to the latest association value corresponding to the first user, so that the first user may use the permission corresponding to the latest association value corresponding to the first user.

Step 405, the initial association value displayed on the page is updated to the obtained new association value.

Optionally, the above-mentioned execution subject may also transmit prompt information to the first user alone so as to prompt the first user that the association value corresponding to the first user has been updated.

In some optional implementations of the present embodiment, the above-mentioned execution subject may display user information of a user having the user tag to the terminal equipment used by the second user in response to receiving a request transmitted by the second user by virtue of used terminal equipment and used for requesting to view the user having the user tag.

Wherein, the user information may refer to any information relevant to the user. The user information may be different according to different application scenarios. For example, the user information may be user information and the like submitted when a register account is registered by a user. Optionally, the user information may include a latest association value between the user and the second user.

The above-mentioned execution subject may also detect various operations of the second user. The second user may view relevant information of all users having user tags corresponding to himself/herself so as to know about detailed information of users associated with himself/herself.

In some optional implementations of the present embodiment, the above-mentioned execution subject receives a new user tag transmitted by the second user by virtue of the used terminal equipment and changes the user tag corresponding to the second user to the received new user tag in response to receiving a request transmitted by the second user by virtue of used terminal equipment and used for requesting to change the user tag.

It can be seen from FIG. 4 that compared with the corresponding embodiment in FIG. 2, the process flow 400 of the method for displaying information in the present embodiment highlights the step that the association value corresponding to the first user is updated in time according to the interaction operation of the first user on the page of the second user after the association value corresponding to the second user is initialized for the first user. Therefore, the solution described in the present embodiment may guarantee the quantization flexibility of the association value. The interaction between the first user and the second user may be used as an aspect for embodying the association degree between the first user and the second user, so that the corresponding association value may be updated according to a specific user operation to express the association degree between the first user and the second user as accurately as possible.

Figure 5:
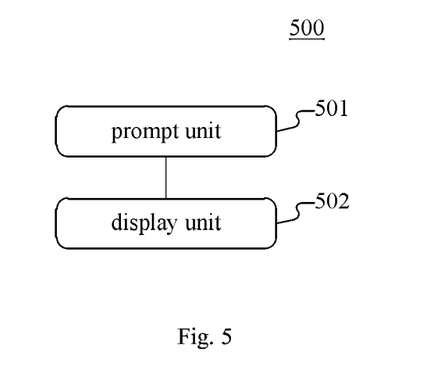
FIG. 5 is a structural schematic diagram of one embodiment of a device for displaying information according to the present disclosure.

Further referring to FIG. 5, as an implementation of the method shown in each of the above-mentioned drawings, the present disclosure provides one embodiment of a device for displaying information. The embodiment of the device corresponds to the embodiment of the method shown in FIG. 2, and the device may be specifically applied to various electronic equipment.

As shown in FIG. 5, a device 500 for displaying information provided by the present embodiment includes a prompt unit 501 and a display unit 502. The prompt unit 501 is configured to transmit operation prompt information to terminal equipment used by a first user in response to detection that the first user performs a first preset operation on a page of a second user, wherein the page of the second user is used for displaying contents shared by the second user, the first preset operation is used for requesting to add a user tag corresponding to the second user for the first user, and the operation prompt information is used for prompting the first user to perform a second preset operation. The display unit 502 is configured to add the user tag for the first user in response to detection that the first user completes the second preset operation, generate an initial association value for expressing an association degree between the first user and the second user, and display the initial association value on the page of the second user.

In the present embodiment, in the device 500 for displaying information, specific processing of the prompt unit 501 and the display unit 502 and technical effects brought by them may respectively refer to relevant descriptions of steps 201 and 202 in the corresponding embodiment in FIG. 2, the descriptions thereof are omitted herein.

In some optional implementations of the present embodiment, the above-mentioned device 500 for displaying information further includes an acquisition unit (not shown in the drawing) configured to acquire attribute information of a target attribute of the preset interaction operation in response to detection that the first user performs a preset interaction operation on the page of the second user; and an update unit configured to update the initial association value according to the attribute information to obtain a new association value; and the update unit is further configured to update the initial association value displayed on the page of the second user to the obtained new association value.

In some optional implementations of the present embodiment, the preset interaction operation includes at least one of the following operations: an access operation, an operation of transmitting a link address of the page of the second user and a virtual item associated operation, wherein the virtual item associated operation is used for adding a virtual item into a virtual item set of the second user.

In some optional implementations of the present embodiment, the above-mentioned device 500 for displaying information further includes an addition unit (not shown in the drawing) configured to add a virtual item corresponding to the initial association value into a virtual item set of the first user; and the addition unit is further configured to add a virtual item corresponding to the obtained new association value into the virtual item set of the first user.

In some optional implementations of the present embodiment, the above-mentioned device 500 for displaying information further includes a user information display unit (not shown in the drawing) configured to display user information of the user having the user tag to the terminal equipment used by the second user in response to receiving a request transmitted by the second user by virtue of used terminal equipment and used for requesting to view a user having the user tag, wherein the user information includes a latest association value between the user and the second user.

In some optional implementations of the present embodiment, the above-mentioned device 500 for displaying information further includes a user tag change unit (not shown in the drawing) configured to receive a new user tag transmitted by the second user by virtue of the used terminal equipment and change the user tag corresponding to the second user to the received new user tag in response to receiving a request transmitted by the second user by virtue of used terminal equipment and used for requesting to change the user tag.

According to the device provided by the above-mentioned embodiment of the present disclosure, the prompt unit transmits operation prompt information to terminal equipment used by the first user in response to detection that a first user performs a first preset operation on a page of a second user, wherein the page of the second user is used for displaying contents shared by the second user, the first preset operation is used for requesting to add a user tag corresponding to the second user for the first user, and the operation prompt information is used for prompting the first user to perform a second preset operation; and the display unit adds the user tag for the first user in response to detection that the first user completes the second preset operation, generates an initial association value for expressing an association degree between the first user and the second user, and displays the initial association value on the page, so that an operation access establishing an association relationship with the user is provided for other users on a page of a user, an association degree among the users is quantitatively expressed after the association relationship is established, and then, more information on the association relationship among the users is obtained.

Figure 6:
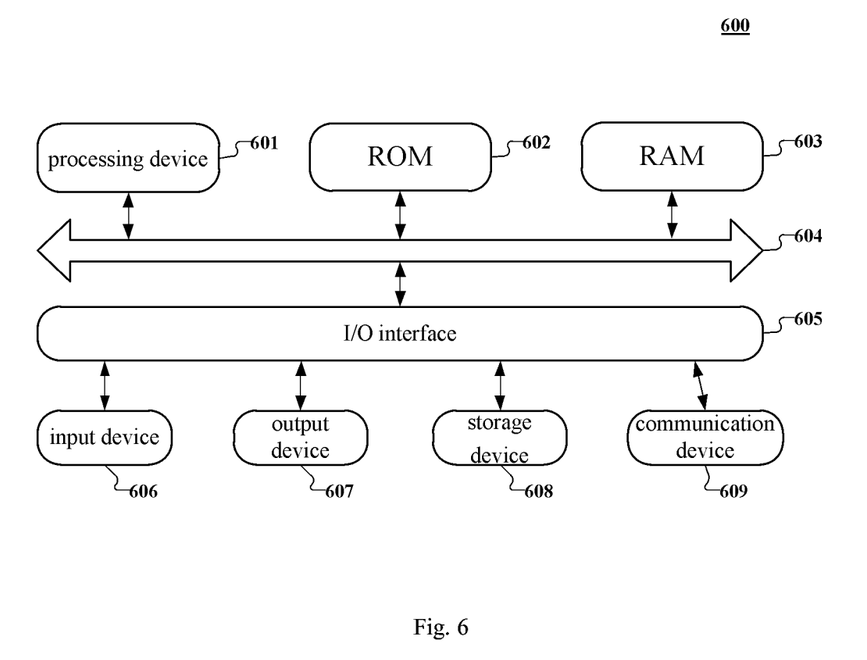
FIG. 6 is a structural schematic diagram of electronic equipment suitable for implementing the embodiments of the present disclosure.

Reference is now made to FIG. 6, which shows a schematic structural diagram of an electronic equipment (the server shown in FIG. 1) 600 suitable for implementing embodiments of the present disclosure. The server shown in FIG. 6 is only an example, and should not bring any limitation to the functions and scope of use of the embodiments of the present disclosure.

As shown in FIG. 6, the electronic equipment 600 may include a processing device (e.g., a central processor, a graphics processor, etc.) 601 that may perform a variety of suitable actions and processes in accordance with a program stored in a read-only memory (ROM) 602 or a program loaded from a storage device 608 into a random access memory (RAM) 603. In the RAM 603, various programs and data required for the operation of the electronic equipment 600 are also stored. The processing device 601, the ROM 602 and the RAM 603 are connected to each other via a bus 604. An input/output (I/O) interface 605 is also connected to the bus 604.

In general, the following devices may be connected to the I/O interface 605: an input device 606 including, for example, a touch screen, a touch pad, a keyboard, a mouse, a camera, a microphone, an accelerometer, a gyroscope, etc.; an output device 607 including, for example, a liquid crystal display (LCD), a speaker, a vibrator, etc.; a storage device 608 including, for example, magnetic tape, hard disk, etc.; and a communication device 609. The communication device 609 may allow the electronic equipment 600 to communicate in a wireless or wired manner with other equipments to exchange data. Although FIG. 6 illustrates a electronic equipment 600 having a variety of devices, it should be understood that not all illustrated devices are required to be implemented or provided. More or fewer devices may alternatively be implemented or provided.

Particularly, in accordance with embodiments of the present disclosure, the processes described above with reference to the flowcharts may be implemented as computer software programs. For example, embodiments of the present disclosure include a computer program product comprising a computer program carried on a computer-readable medium, the computer program containing program code for performing the methods shown in the flowchart. In such an embodiment, the computer program may be downloaded and installed from the network via the communication device 609, or installed from the storage device 608, or installed from the ROM 602. When the computer program is executed by the processing device 601, the above-mentioned functions defined in the method of the embodiments of the present disclosure are performed.

It should be noted that the computer storage media described in embodiments of the present disclosure may be computer readable signal media or computer readable storage media or any combination of the two. The computer-readable storage medium may be, for example but not limited to, an electrical, magnetic, optical, electromagnetic, infrared, or semiconductor system, apparatus, or device, or any combination thereof. More specific examples of computer-readable storage media may include, but are not limited to: an electrical connection having one or more wires, a portable computer diskette, a hard disk, a random access memory (RAM), a read only memory (ROM), an erasable programmable read-only memory (EPROM) or flash memory (FLASH), an optical fiber, a compact disc read-only memory (CD-ROM), an optical storage device, a magnetic storage device, or any suitable combination thereof. In the present disclosure, a computer-readable storage medium can be any tangible medium that can contain or store a program for use by or in connection with an instruction execution system, apparatus, or device. In the present disclosure, a computer-readable signal medium may include a data signal that propagates in baseband or as part of a carrier wave, carrying computer-readable program code. Such propagated data signals may take many forms, including but not limited to electromagnetic signals, optical signals, or any suitable combination thereof. The computer-readable signal medium may also be any computer-readable medium other than the computer-readable storage medium that can transmit, propagate, or transport the program for use by or in connection with the instruction execution system, apparatus, or device. The program code embodied on the computer-readable medium may be transmitted using any suitable medium including, but not limited to: wire, fiber optic cable, radio frequency (RF), and the like, or any suitable combination thereof.

The computer-readable medium can be contained in the server; it may also be separate and not assembled into the electronic equipment. The computer-readable medium carries one or more programs which, when executed by the electronic equipment, cause the electronic equipment to: transmitting operation prompt information to terminal equipment used by the first user in response to detection that a first user performs a first preset operation on a page of a second user, wherein the page is used for displaying contents shared by the second user, the first preset operation is used for requesting to add a user tag corresponding to the second user for the first user, and the operation prompt information is used for prompting the first user to perform a second preset operation; adding the user tag for the first user in response to detection that the first user completes the second preset operation, generating an initial association value for expressing an association degree between the first user and the second user, and displaying the initial association value on the page of the second user.

Computer program code for carrying out operations of the present disclosure may be written in one or more programming languages, including object-oriented programming languages such as Java, Smalltalk, C++, and conventional procedural programming languages such as the "C" language or similar programming languages. The program code may execute entirely on the user's computer, partially on the user's computer, as a stand-alone software package, partially on the user's computer, partially on a remote computer, or entirely on a remote computer or server. In the case of a remote computer, the remote computer may be connected to the user computer through any kind of network, including a local area network (LAN) or a wide area network (WAN), or may be connected to an external computer (e.g., through the Internet using an Internet service provider).

The flowcharts and block diagrams in the drawings illustrate the architecture, functionality, and operation of possible implementations of systems, methods, and computer program products in accordance with various embodiments of the present disclosure. In this regard, each block of the flowcharts or block diagrams may represent a module, segment, or portion of code, which comprises one or more executable instructions for implementing the specified logical function (s). It should also be noted that in some alternative implementations, the functions noted in the blocks may occur out of the order noted in the figures. For example, two blocks shown in succession may, in fact, be executed substantially concurrently or they may sometimes be executed in the reverse order, depending upon the functionality involved. It is also noted that each block of the block diagrams and/or flowchart illustrations, and combinations of blocks in the block diagrams and/or flowchart illustrations, can be implemented by special purpose hardware-based systems which perform the specified functions or operations, or combinations of special purpose hardware and computer instructions.

The units described in the embodiments of the present disclosure may be implemented in software or in hardware. The described unit can also be provided in the processor, for example, it can be described as: a processor includes a prompt unit and a display unit. Among them, the names of these units do not constitute a limitation on the unit itself under certain circumstances. For example, the prompt unit can also be described as "a unit transmitting operation prompt information to terminal equipment used by the first user in response to detection that a first user performs a first preset operation on a page of a second user, wherein the page is used for displaying contents shared by the second user, the first preset operation is used for requesting to add a user tag corresponding to the second user for the first user, and the operation prompt information is used for prompting the first user to perform a second preset operation".

The foregoing description is only illustrative of the embodiments of the present disclosure and the technical principles employed. It should be understood by those skilled in the art that the scope of the disclosure referred to in this disclosure is not limited to the particular combination of features described above, but is intended to cover other embodiments which may be formed by any combination of features described above or their equivalents without departing from the spirit of the disclosure. For example, the above-mentioned features are mutually replaced with technical features disclosed in the present disclosure (but not limited to) having similar functions to form a technical solution.

The invention claimed is:

1. A method for displaying information, comprising:
   transmitting operation prompt information to terminal equipment used by a first user in response to detecting that the first user performed a first preset operation on a live broadcast page of a second user, the second user is displaying one or both of current and historical live broadcasting on the live broadcast page of the second user, wherein the live broadcast page of the second user is used for displaying contents shared by the second user, the first preset operation is used for requesting to add a user tag corresponding to the second user for the first user, and the operation prompt information is used for prompting the first user to perform a second preset operation;
   adding the user tag for the first user in response to detecting that the first user completes the second preset operation;
   generating an initial association value for expressing an association degree between the first user and the second user; and
   displaying the initial association value on the live broadcast page;
   displaying user information of the first user having the user tag to the terminal equipment used by the second user in response to receiving a request transmitted by the second user by virtue of used terminal equipment and used for requesting to view the first user having the user tag, wherein the user information comprises a latest association value between the first user and the second user, the latest association value between the first user and the second user incrementing of a number of interactions between the first user and the second user and prolonging a staying time of the first user on the live broadcast page; and
   receiving a new user tag transmitted by the second user by virtue of the used terminal equipment, and changing the user tag corresponding to the second user to the received new user tag in response to receiving a request transmitted by the second user by virtue of the used terminal equipment and used for requesting to change the user tag.

2. The method of claim 1, wherein the method further comprises:
   acquiring attribute information of a target attribute of a preset interaction operation in response to detection that the first user has performed the preset interaction operation on the live broadcast page;
   updating the initial association value according to the attribute information to obtain a new association value; and
   updating the initial association value displayed on the live broadcast page to the obtained new association value.

3. The method of claim 2, wherein the preset interaction operation further comprises at least one of the following operations: an access operation, and an operation of transmitting a link address of the live broadcast page and a virtual item associated operation, wherein the virtual item associated operation is used for adding a virtual item into a virtual item set of the second user.

4. The method of claim 3, wherein the method further comprises:
   displaying user information of the first user having the user tag to the terminal equipment used by the second user in response to receiving a request transmitted by the second user by virtue of used terminal equipment and used for requesting to view the first user having the user tag, wherein the user information comprises a latest association value between the first user and the second user.

5. The method of claim 3, wherein the method further comprises:
   receiving a new user tag transmitted by the second user by virtue of the used terminal equipment, and changing the user tag corresponding to the second user to the received new user tag in response to receiving a request transmitted by the second user by virtue of used terminal equipment and used for requesting to change the user tag.

6. The method of claim 2, wherein the method further comprises:
   adding a virtual item corresponding to the initial association value into a virtual item set of the first user; and
   after the initial association value is updated according to the attribute information to obtain the new association value, the method further comprises: adding a virtual item corresponding to the obtained new association value into the virtual item set of the first user.

7. The method of claim 6, wherein the method further comprises:
displaying user information of the first user having the user tag to the terminal equipment used by the second user in response to receiving a request transmitted by the second user by virtue of used terminal equipment and used for requesting to view the first user having the user tag, wherein the user information comprises a latest association value between the first user and the second user.

8. The method of claim 6, wherein the method further comprises:
receiving a new user tag transmitted by the second user by virtue of the used terminal equipment, and changing the user tag corresponding to the second user to the received new user tag in response to receiving a request transmitted by the second user by virtue of used terminal equipment and used for requesting to change the user tag.

9. The method of claim 2, wherein the method further comprises:
displaying user information of the first user having the user tag to the terminal equipment used by the second user in response to receiving a request transmitted by the second user by virtue of used terminal equipment and used for requesting to view the first user having the user tag, wherein the user information comprises a latest association value between the first user and the second user.

10. The method of claim 2, wherein the method further comprises:
receiving a new user tag transmitted by the second user by virtue of the used terminal equipment, and changing the user tag corresponding to the second user to the received new user tag in response to receiving a request transmitted by the second user by virtue of used terminal equipment and used for requesting to change the user tag.

11. The method of claim 1, wherein the method further comprises:
amending parameters for characterizing a user permission according to a latest association value corresponding to the first user to enable the first user to have a permission corresponding to the latest association value.

12. The server of claim 1, further comprising one or more programs that, when executed by the processor, causes the server to:
acquire attribute information of a target attribute of a preset interaction operation in response to detection that the first user performed the preset interaction operation on the live broadcast page;
update the initial association value according to the attribute information to obtain a new association value; and
update the initial association value displayed on the live broadcast page to the obtained new association value.

13. The server of claim 12, wherein the preset interaction operation comprises at least one of the following operations:
an access operation; and
an operation of transmitting a link address of the live broadcast page and a virtual item associated operation, wherein the virtual item associated operation is used for adding a virtual item into a virtual item set of the second user.

14. The server of claim 12, further comprising one or more programs that, when executed by the processor, causes the server to:
add a virtual item corresponding to the initial association value into a virtual item set of the first user; and
after the initial association value is updated according to the attribute information to obtain the new association value, add a virtual item corresponding to the obtained new association value into the virtual item set of the first user.

15. A server, comprising:
a processor; and
a storage device storing one or more programs that, when executed by the processor, causes the server to:
transmit operation prompt information to terminal equipment used by a first user in response to detecting that the first user performed a first preset operation on a live broadcast page of a second user, the second user is displaying one or both of current and historical live broadcasting on the live broadcast page of the second user, wherein the live broadcast page of the second user is used for displaying contents shared by the second user, the first preset operation is used for requesting to add a user tag corresponding to the second user for the first user, and the operation prompt information is used for prompting the first user to perform a second preset operation;
add the user tag for the first user in response to detecting that the first user completes the second preset operation;
generate an initial association value for expressing an association degree between the first user and the second user;
display the initial association value on the live broadcast page;
display user information of the first user having the user tag to the terminal equipment used by the second user in response to receiving a request transmitted by the second user by virtue of used terminal equipment and used for requesting to view the first user having the user tag, wherein the user information comprises a latest association value between the first user and the second user, the latest association value between the first user and the second user incrementing of a number of interactions between the first user and the second user and prolonging a staying time of the first user on the live broadcast page; and
receive a new user tag transmitted by the second user by virtue of the used terminal equipment, and change the user tag corresponding to the second user to the received new user tag in response to receiving a request transmitted by the second user by virtue of used terminal equipment and used for requesting to change the user tag.

16. A computer readable medium, stored with a computer program therein, wherein when the program is executed by a processor, causing the processor to implement a method comprising:
transmitting operation prompt information to terminal equipment used by a first user in response to detection that the first user performs a first preset operation on a live broadcast page of a second user, the second user is displaying one or both of current and historical live broadcasting on the live broadcast page of the second user, wherein the live broadcast page of the second user is used for displaying contents shared by the second user, the first preset operation is used for requesting to add a user tag corresponding to the second user for the first user, and the operation prompt information is used for prompting the first user to perform a second preset operation;

adding the user tag for the first user in response to detecting that the first user completes the second preset operation;

generating an initial association value for expressing an association degree between the first user and the second user;

displaying the initial association value on the live broadcast page;

displaying user information of the first user having the user tag to the terminal equipment used by the second user in response to receiving a request transmitted by the second user by virtue of used terminal equipment and used for requesting to view the first user having the user tag, wherein the user information comprises a latest association value between the first user and the second user, the latest association value between the first user and the second user incrementing of a number of interactions between the first user and the second user and prolonging a staying time of the first user on the live broadcast page; and receiving a new user tag transmitted by the second user by virtue of the used terminal equipment, and changing the user tag corresponding to the second user to the received new user tag in response to receiving a request transmitted by the second user by virtue of the used terminal equipment and used for requesting to change the user tag.

* * * * *